United States Patent [19]

Richards et al.

[11] Patent Number: 5,419,614
[45] Date of Patent: May 30, 1995

[54] CREWSEAT WITH ADJUSTABLE LUMBAR AND THIGH SUPPORTS

[75] Inventors: Marvin K. Richards, Gilbert; Leslie D. Peterson; Caroline VanIngen-Dunn, both of Phoenix, all of Ariz.

[73] Assignee: Simula Inc., Phoenix, Ariz.

[21] Appl. No.: 67,467

[22] Filed: May 25, 1993

[51] Int. Cl.[6] .................................................. A47C 7/14
[52] U.S. Cl. ................................. 297/284.11; 297/284.4
[58] Field of Search ............... 297/284.1, 284.4, 284.8, 297/284.11, 452.55, 313

[56] References Cited

U.S. PATENT DOCUMENTS

| | | | |
|---|---|---|---|
| 3,762,769 | 10/1973 | Poschl | 297/284.4 |
| 4,153,294 | 5/1979 | Meiller et al. | 297/284.11 |
| 4,165,126 | 8/1979 | Strien et al. | 297/284.11 |
| 4,324,431 | 4/1982 | Murphy et al. | |
| 4,465,317 | 8/1984 | Schwarz | |
| 4,469,374 | 9/1984 | Kashihara et al. | |
| 4,491,365 | 1/1985 | Murakami | |
| 4,531,779 | 7/1985 | Hashimoto | |
| 4,725,095 | 2/1988 | Benson et al. | |
| 4,834,455 | 5/1989 | Proctor | |
| 4,915,447 | 4/1990 | Shovar | 297/284.11 |
| 5,007,677 | 4/1991 | Ozawa et al. | |
| 5,088,790 | 2/1992 | Wainwright et al. | |
| 5,174,526 | 12/1992 | Kanigowski | 297/284.4 X |

FOREIGN PATENT DOCUMENTS 114135 7/1964 Japan ..................... 297/284.11

OTHER PUBLICATIONS

Beach, A., "A Review of the Pilot Backache Problem in the CH113 Labrador Helicopter," Defence and Civil Institute of Environmental Medicine, Dec. 1985.
Goede, M., "Backache in Helicopter Pilots," Flight Lines Aviation Newsletter, pp. 64–67.

Primary Examiner—Peter R. Brown
Attorney, Agent, or Firm—Kirkland & Ellis

[57] ABSTRACT

The present invention relates to crewseats for aircraft such as helicopters, and to thigh support and lumbar support mechanisms for such crewseats. The thigh support mechanism is a tilt plate hingeably attached to a base plate, and a locking tang extending downward from the tilt plate to engage a lock lug attached to the base plate. The lumbar support mechanism is a flex plate between the seat back cushion and the rigid back of the crewseat. The degree of bow in the flex plate can be adjusted by moving an adjustment lever up or down, thus rotating a cam shaft, and a lift cam attached to the cam shaft. The lift cam increases or decreases the amount of bow in the flex plate, according to the position of the adjustment lever.

21 Claims, 4 Drawing Sheets

CREWSEAT WITH ADJUSTABLE LUMBAR AND THIGH SUPPORTS

The U.S. government has certain rights in this invention in accordance with the terms of Contract No. DAAJ09-90-C-0934, awarded by the U.S. Army.

BACKGROUND

1. Field of the Invention

The present invention relates to crewseats in aircraft such as helicopters, which have adjustable lumbar and thigh supports.

2. Background of the Invention

Support mechanisms for the lumbar spine and thighs are commonly integrated into the structure of crewseats in aircrafts. However, the specific environment of certain aircraft, e.g., helicopters, imposes demanding design requirements. The mechanism must adjust to accommodate a wide range of body types and sizes, it must not affect the aircraft's operation or obstruct egress (i.e., no dangling or bulky components), it must be lightweight, it must be quickly adjustable, it must be relatively inexpensive and maintainable, and it must be highly durable and crashworthy.

Generally, there are three types of supports possible for seating apparatus: inflatable supports, fixed supports and mechanical supports. Inflatable supports comprise one or more inflatable bladders and an inflator. Inflatable supports are often found in automotive seats, but are not suited for use in military aircraft, mainly because bladders cannot maintain a fixed level of support as the differential pressure of the bladders varies with altitude. Additionally, the hand pumps used to inflate the bladders are generally bulb-like appendages that can hinder operation of the aircraft, or block emergency egress. The hand pumps also require an excessive amount of time to inflate and to adjust the bladder size. The inflatable mechanisms require more maintenance than the other mechanisms, and are not as durable.

Fixed support devices generally comprise specially contoured cushions or pads. However, this type of support is poorly suited for use in military helicopters because it offers minimal adjustment capabilities. Occupants having significantly different body sizes and body contours cannot all derive adequate support from such non-adjustable devices. Additionally, these devices are often too bulky for many environments, such as helicopter cockpits.

Mechanical support devices generally provide support to the lumbar spine and thighs using rollers, levers, and camshafts. Adjustable supports for crewseats often rely on a series of link arms and/or threaded screw shafts. Although these types of devices provide satisfactory support in automotive applications, they are not suitable for more demanding environments such as helicopters due to their limited durability under repetitive use and impact loads. For example, U.S. Pat. No. 5,088,790 to Colasanti et al. describes a lumbar support mechanism that uses a screw shaft actuated by a hand crank. When the screw shaft is rotated, a linkage attached to traveling nuts moves a pressure applicator either forward or backward, thus altering the contours of the lumbar region. Similarly, U.S. Pat. No. 4,469,374 to K. Jo et al. uses two threaded axles and moving thread holders. U.S. Pat. No. 5,007,677 to H. Yasuo et al., describes a pivotable lumbar support member whose moving means comprises a link arm, an intermediate link, a drive link and a drive shaft. U.S. Pat. No. 4,465,317 to Schwarz, and U.S. Pat. No. 4,725,095 to Benson, also describe devices with a large number of moving parts.

Unlike these prior art mechanical supports, supports for demanding environments such as helicopters must use a comparatively simple design with a minimum number of moving parts to assure durability and maintainability. For example, helicopters are routinely subjected to vertical impact loads, which can misalign or damage linkages or vertically disposed members.

Another reason why automotive supports cannot be adapted for use in the more demanding aircraft environment is that many automotive mechanisms actuate the lumbar adjustment by shifting the back cushion, or the whole seat back structure up and down. This is particularly unsuited in military aircraft seats that have a solid armor construction. For example, U.S. Pat. No. 4,834,455 describes a seat back that includes a fixed "protruding lumbar support." The seat back, and hence the lumbar support, is adjustable in a vertical direction. Similarly, U.S. Pat. No. 4,531,779 to Hashimoto describes a seat back with a pivotable support mechanism that allows the seat back cushion to "shift upwardly and downwardly as the angular relation of said cushion is adjusted." An additional problem with automotive supports is their relatively poor crashworthiness. Seat backs or cushions that are supported by relatively fragile structural members, such as toothed racks or threaded shafts, do not provide helicopter seats with adequate crash worthiness.

Many of the prior art thigh adjustment devices include rollers, rotatable shafts, or camshafts. Generally, these devices are not suitable for use in helicopters due to the irregular shape of the seat cushion in the helicopter. The rectangular cutout in the front edge of the seat cushion that accommodates the helicopter's cyclic control stick limits the forward travel of moving rollers, or the forward position of camshaft devices, thereby limiting their effectiveness. For example, U.S. Pat. No. 4,324,431 to Heling et al. describes a thigh support design with a slideable thigh support shaft. This invention could only be installed in a helicopter seat if it had a considerably shorter slide path. Another drawback of this invention is that it does not provide significant thigh angle adjustment to accommodate a range of leg lengths.

Another prior art adjustment device for automobiles is disclosed in U.S. Pat. No. 4,491,365 to Murakami. This patent describes a thigh adjustment device with a manually operable lever that converts rotational force of a shaft into vertical lift for adjusting the tilt angle of a "thigh support frame."

These prior art devices are not well suited for crashworthiness. For crash protection purposes, it is desirable to have a minimal amount of distance between the ischial tuberosities and the seat pan. It is also not desirable to have moving parts or linkages disposed directly under the ischial tuberosities. Otherwise, hard landings or survivable crashes may lead to unnecessary personal injury of the crewmember.

SUMMARY OF THE INVENTION

The present invention comprises a seat cushion assembly having an adjustable lumbar support device and a seat pan cushion assembly. The seat pan cushion assembly provides an adjustable thigh support mechanism and specially-designed padding features. By allowing the occupant to adjust manually a wide range of seating features both before and while he is seated, the occupant is able to redistribute his body weight and minimize the lumbar, leg and buttocks discomfort that might otherwise result from extended periods of sitting in an uncomfortable position, and from extended periods of sitting in one position.

The lumbar support device is disposed directly behind the seat back cushion. An adjustment lever extends outside the seat back cushion and can be moved up or down to adjust the lumbar support. The up or down action of the lever rotates a cam shaft within the seat back cushion. The cam shaft extends horizontally across the lumbar portion of the seat back. As the cam shaft is rotated, a connected lift cam also rotates to apply greater or lesser force against a flex plate which backs upon the lumbar portion of the seat back cushion.

The midsection of the flex plate is displaced horizontally as the lift cam is rotated, while the vertical placement of the flex plate remains relatively constant. This causes the flex plate to bow outward against the lumbar portion of the seat cushion, thereby providing variable lumbar support for the seat's occupant. Such support allows the seat's occupant to maintain the back posture best suited for his particular upper body, for prolonged seating periods without the back discomfort usually associated with an extensive sitting time. Further, the variable support is adjustable to accommodate a wide range of seat occupants, and can be adjusted during flight to allow the occupant to shift positions.

The adjustment lever and the rotationally attached cam lift are held in the position selected by the seat occupant by a return spring that locks the lever into one of several locking positions.

The adjustable thigh support mechanism comprises a seat pan cushion mounted to a tilt plate whose angle of elevation can be varied relative to the horizontally-fixed base plate of the seat cushion assembly. The rear end of the tilt plate is attached to the rear of the base plate by a tilt hinge. A hinged handle is located at the front of the tilt plate. The hinged handle extends downward and is attached to a downwardly disposed locking tang. The locking tang has multiple slots arranged vertically along the tang. Lock lugs extending from the front of the base plate fit into the slots of the locking tang.

To adjust the angle of the seat pan cushion's tilt plate, the hinged handle is brought back towards the seat back cushion to disengage the slots of the locking tang from the lock lugs. The angle of the hinged tilt plate is then increased or decreased as the locking tang is moved up or down until the seat occupant finds a comfortable seat pan angle. The hinged handle is then released and the appropriate slot of the locking tang slips onto the lock lug. An extension spring running from the point where the handle joins the locking tang to a tab located further back on the bottom face of the tilt plate pulls the attached locking tang back into a locked position about the lock lugs when the force on the handle is released. The angle of the seat pan cushion's tilt plate is thus maintained until the next adjustment of the locking tang.

Because the thigh support mechanism of the present invention is adjustable, it allows a wide range of occupants to minimize the poor circulation, numbness, and muscle fatigue that would be caused by sitting for long periods of time without proper support.

The special padding feature comprises a cushion with a firm contoured surface and several layers of cushioning material to distribute seating pressure evenly across the lower extremities and to dampen vibration. A contoured seat cushion foundation is made of a semi-rigid material, such as polyethylene foam. This foundation is covered with another layer of deformable material, such as polyurethane foam. Disposed between these two layers is an insert of energy-absorbing, rate-sensitive material. During normal conditions, the energy-absorbing material conforms to the shape of the seat occupant and evenly distributes the loads applied to the seat cushion assembly. During rapid vertical acceleration or deceleration, however, the insert responds rigidly to cushion the seat occupant from impact forces and to absorb vibration.

Accordingly, it is an object of the present invention to provide a new and improved aircraft seat cushion assembly which is ideally suited for use in cramped cockpits by flight crew members who are required to maintain unnatural postures for prolonged periods of time.

Another object of the present invention is to provide a new and improved seat cushion assembly which provides improved support and comfort and which can be retrofitted into existing vehicles.

Another object of the present invention is to provide a new and improved seat back cushion assembly which provides an integrated adjustable lumbar support mechanism which accommodates a wide range of back shapes, to provide back comfort.

Another object of the present invention is to provide a new and improved seat pan cushion assembly which provides an integrated adjustable thigh angle mechanism which accommodates a range of leg sizes, to provide leg comfort.

Another object of the present invention is to provide a new and improved seat pan cushion which provides improved buttock support and comfort.

Another object of the present invention is to provide a new and improved seat pan cushion which provides an energy absorbing insert to cushion the pelvis in the event of sudden vertical acceleration or deceleration.

Another object of the present invention is to provide a new and improved seat cushion assembly which can be adjusted while the occupant is seated to redistribute the occupant's body weight and to reduce the lumbar, legs, and buttocks discomfort that might otherwise result from extended periods of sitting in one position.

These and other objects of the present invention are described in greater detail in the detailed description of the invention, the appended drawings and the attached claims.

DETAILED DESCRIPTION OF THE PREFERRED INVENTION

The present invention is a crewseat wherein the occupant can change the position of the lumbar adjustment lever to customize the degree of lumbar support for his or her lower back. The occupant can also change the angle of the seat pan cushion on which he or she is seated to adjust the amount of leg and thigh support. These adjustment capabilities result in comfortable seating arrangements that can be customized before or during seating to a wide range of occupants with varying physical body characteristics. These adjustment mechanisms, along with the design features of the cushions, also encourage a seated posture that is biomechanically better suited for supporting the load of the upper body for extended periods of time. The adjustment mechanisms can also be used during prolonged periods of flight to periodically redistribute body weight, and thus relieve muscular tension.

Figure 1:
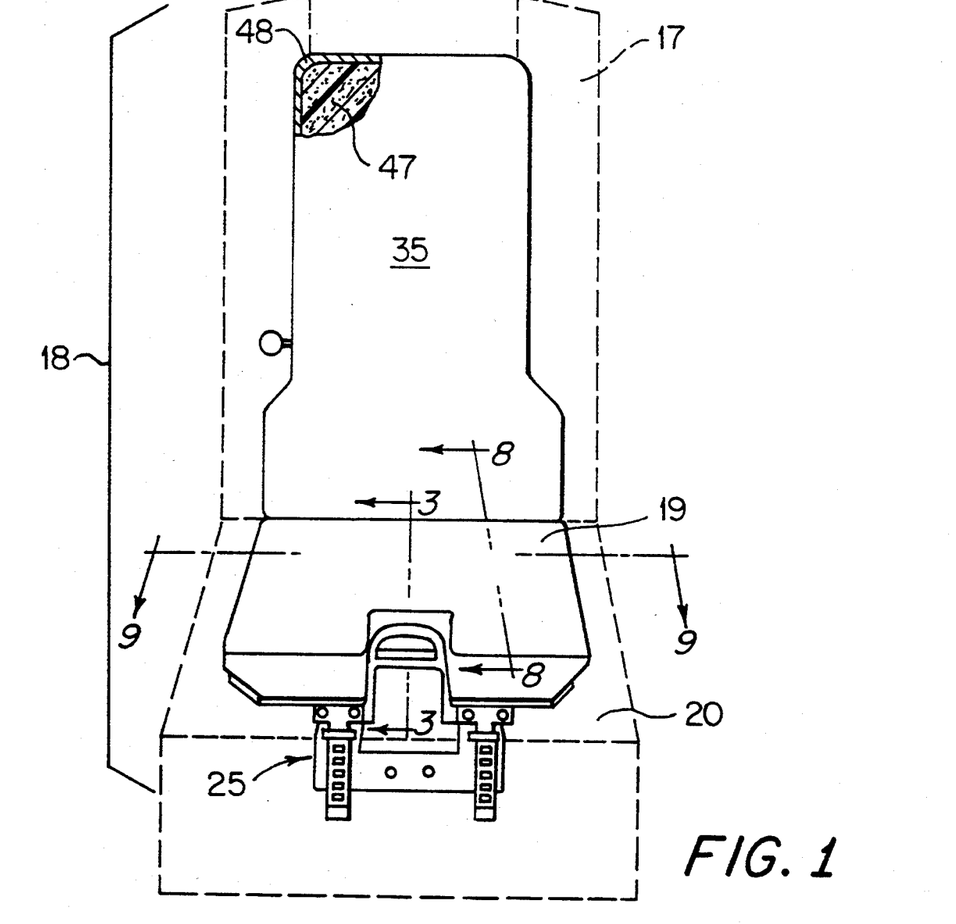
FIG. 1 is a diagram of the crewseat of the present invention.

A preferred embodiment of the present invention is shown in FIG. 1. The seat cushion assembly 18 of the present invention includes a seat back cushion 35, a seat pan cushion 19, a lumbar support mechanism 34, and a thigh-angle adjustment mechanism 25. The present invention is shown as being supported in a typical seating structure 17 which is intended to be indicative of the various types of flightcrew seat buckets used in helicopters. Although such seating structures will vary in arrangement and structural details, they all include a rigid, roughly vertical surface on which lumbar support mechanism 34 and seat back cushion 35 can be attached. They also include a rigid, roughly horizontal seat pan 20, on which seat pan cushion 19 and thigh adjustment mechanism 25 can be supported.

As shown in FIG. 1, seat back cushion 35 consists largely of a cushion material 47 encased in a cushion covering 48. Cushion covering 48 is made of a durable material that provides a wear-resistant outer surface. Cushion material 47 is made of a deformable, air-permeable foam for comfort and ventilation purposes, respectively. It is also durable and lightweight and, thus, is ideally suited for aircraft use.

Figure 2:
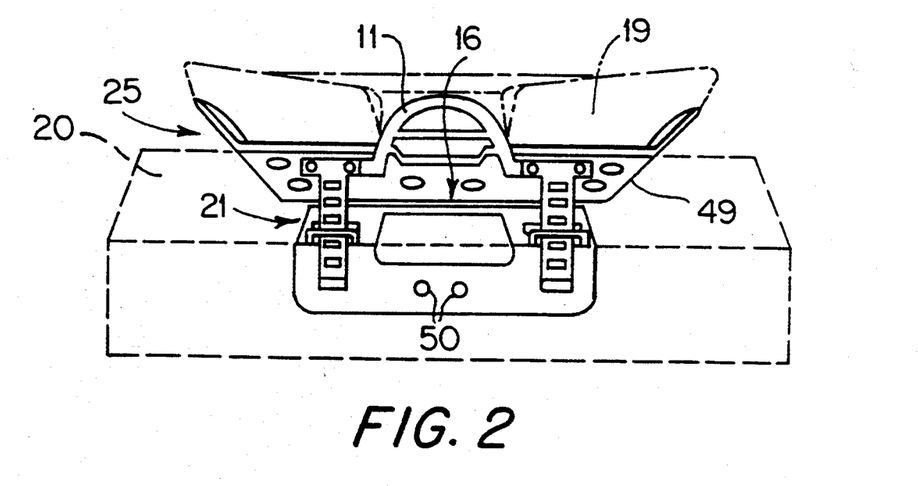
FIG. 2 is a front view of the thigh adjustment mechanism.
Figure 3:
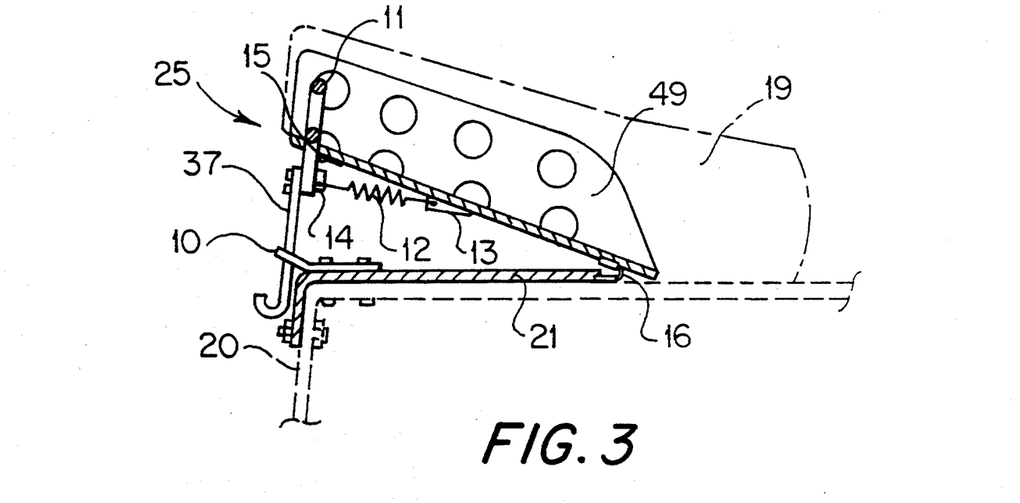
FIG. 3 is a side view of the thigh adjustment mechanism.

FIGS. 2 and 3 show the thigh-angle adjustment mechanism 25 of the preferred embodiment of the present invention. Thigh-angle adjustment mechanism 25 allows an occupant to modify the vertical angle of his seat cushion. The mechanism comprises a base plate 21, a tilt plate 49, and a mechanism for adjusting the angle that tilt plate 49 forms with respect to base plate 21 (described below with respect to FIG. 3). Base plate 21 is attached to the upper surface of seat pan 20. The front edge of base plate 21 is bent around the front edge of seat pan 20, and is fastened to the front of seat pan 20 by two bolts 50. The bottom surface of base plate 21 is additionally secured to seat pan 20 by additional bolts and hook and loop fasteners. As shown in FIG. 3, two lock lugs 10 are attached to the upper surface of base plate 21. The locking projections of lug locks 10 extend slightly forward of the front edge of base plate 21. Tilt plate 49 is attached to the rear edge of base plate 21 by a tilt hinge 16. Tilt plate 49 supports seat pan cushion 19. The cushion is attached to the upper surface of tilt plate 49 by hook and loop fasteners. Tilt plate 49 has a pattern of circular cutouts to improve ventilation and save weight.

A handle 11 and a pair of locking tangs 37 are attached to the front edge of tilt plate 49 by a pair of hinges 15. The locking tangs 37 are configured with a series of vertically disposed slots to provide several different locking positions. Each locking position corresponds to different angles between tilt plate 49 and base plate 21, providing a variety of thigh angles for the occupant of seat cushion assembly 18. The body of locking tang 37 is disposed through the cutout of lug lock 10. Each locking tang 37 has a curled lower end that prevents its disengagement from lock lug 10.

An extension spring 12 is mounted between tabs 13 and 14, located on the bottom of tilt plate 49 and the rear surface of the bottom of handle 11, respectively. Extension spring 12 draws locking tang 37 back into a locked position in which the lug of lock lug 10 is disposed through one of the slots of locking tang 37. When locking tang 37 is held in a locked position, any angular motion of tilt plate 49 is prevented.

When the occupant desires to modify the angle of seat cushion 19 with respect to seat pan 20, he tilts handle 11 inward toward the seat cushion, causing locking tang 37 to disengage lock lug 10. Handle 11 is positioned between his legs slightly below the upper surface of seat pan cushion 19. In the unlocked position, locking tang 37 is now free to slide up or down, thereby adjusting the angle of tilt plate 49 and modifying the angle of the occupant's thighs with respect to seat pan 20. Thigh-angle adjustment mechanism 25 provides a comfortable range of thigh angles for a wide variety of leg lengths.

The thigh adjustment mechanism of the present invention comprises no moving parts directly under the ischial tuberosities and provides a relatively small distance between the seat pan and the ischial tuberosities (approximately 0.75 inches).

Figure 4:
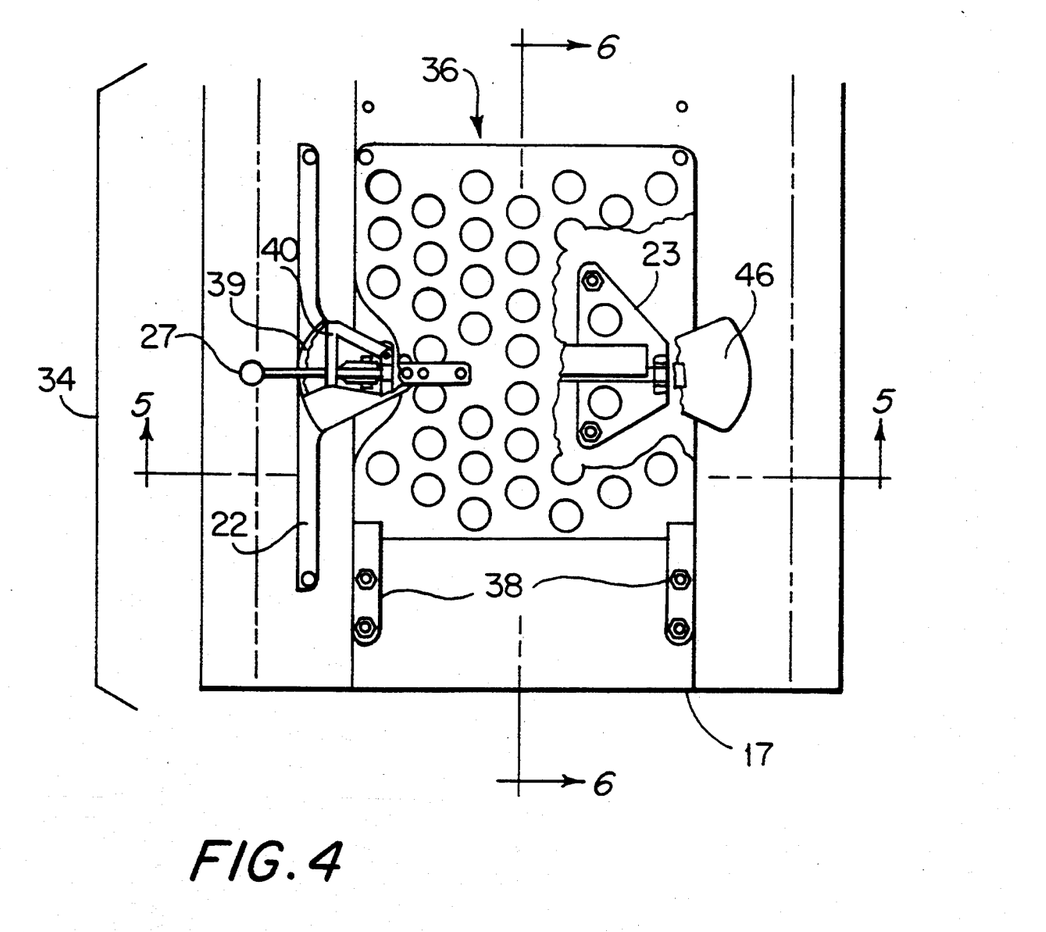
FIG. 4 is a diagram of the lumbar support mechanism.

The adjustable lumbar support mechanism 34 of the present invention is shown in detail in FIGS. 4, 5, 6 and 7. The adjustable lumbar support mechanism 34 consists of an adjustment lever 26, a cam shaft 29 onto which a lift cam 30 has been attached, and a flex plate 36. As shown in FIG. 4, the mechanism is mounted to seat bucket 17 by bolts passing through base plates 22 and 23.

Figure 5:
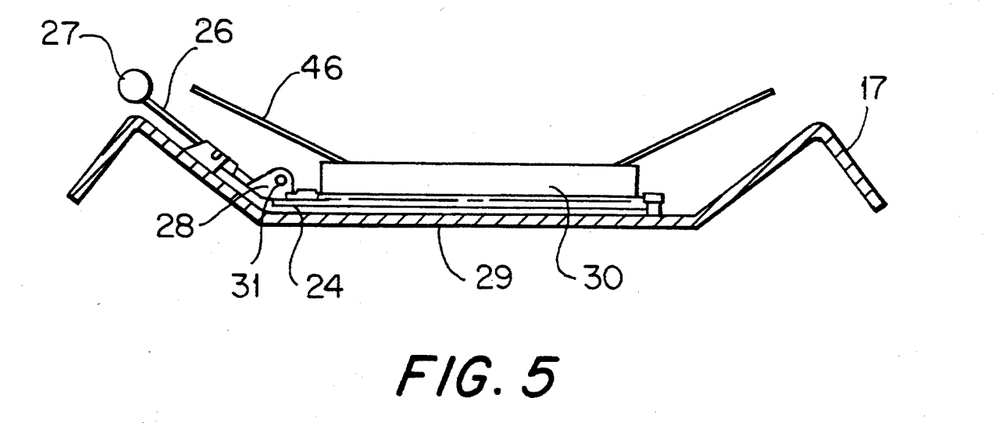
FIG. 5 is a top view of the lumbar support mechanism
Figure 5A:
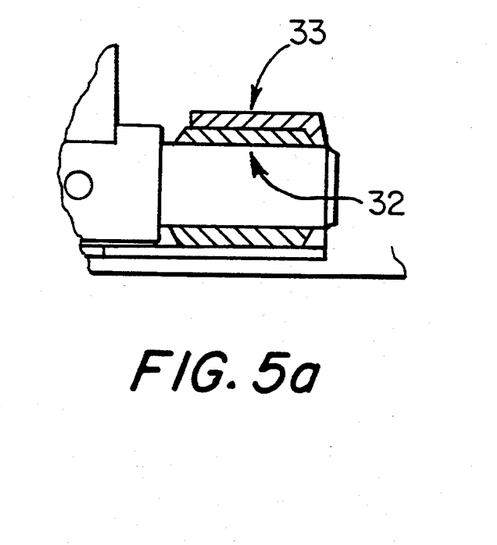
FIG. 5a is a view of a detail from FIG. 5.

FIGS. 4 and 5 show that lumbar support adjustment lever 26 includes an operating knob 27 on one end and a clevis 28 on the other end. As illustrated in FIG. 5, clevis 28 is positioned at an angle to offset the pivot point about which adjustment lever 26 rotates. This offset configuration minimizes the interference between adjustment lever 26 and seat back cushion 35. Lumbar support adjustment lever 26 is connected to cam shaft 29 by means of bolt 31 which attaches clevis 28 to cam shaft tab 24. This connection translates vertical motion of adjustment lever 26 into a rotational motion of cam shaft 29 and lift cam 30. Cam shaft 29 is journalled for rotation in suitable bushings 32. As shown in FIGS. 5 and 5a, bushings 32 are housed in bushing brackets 33 at either end of cam shaft 29. Bushing brackets 33 also secure the cam shaft assembly to base plates 22 and 23.

Flex plate 36 is disposed between lift cam 30 and seat back cushion 35. Flex plate 36 supports seat back cushion 35 and distributes the lumbar support provided by the rotation of lift cam 30 over a wider cushion surface area, thereby improving the seat occupant's lower back comfort. As seen best in FIG. 6, a rotational motion of lift cam 30 causes a horizontal displacement of the midsection of flex plate 36. Flex plate 36 is made of flexible sheet metal. The circular cutouts in flex plate 36, shown in FIG. 7, reduce the weight of the flex plate and enhance its flexibility. It is attached to seat bucket 17 so that its top edge is bolted in a fixed position, its midsection is permitted to bow out around lift cam 30, and its bottom section is secured by flex plate guides 38. Flex plate guides 38 allow the bottom edge of flex plate 36 to displace vertically in order to compensate for various degrees of flex plate bowing. Lateral supports 46 are attached to the sides of flex plate 36 to protect lumbar support mechanism 34 and to support the edge portions of seat back cushion 35.

Figure 6:
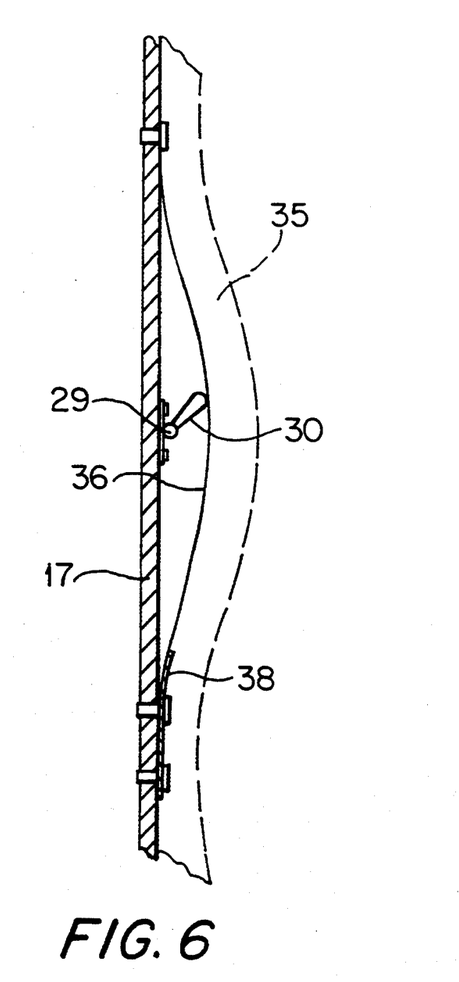
FIG. 6 is a side view of the lumbar support mechanism.
Figure 7:
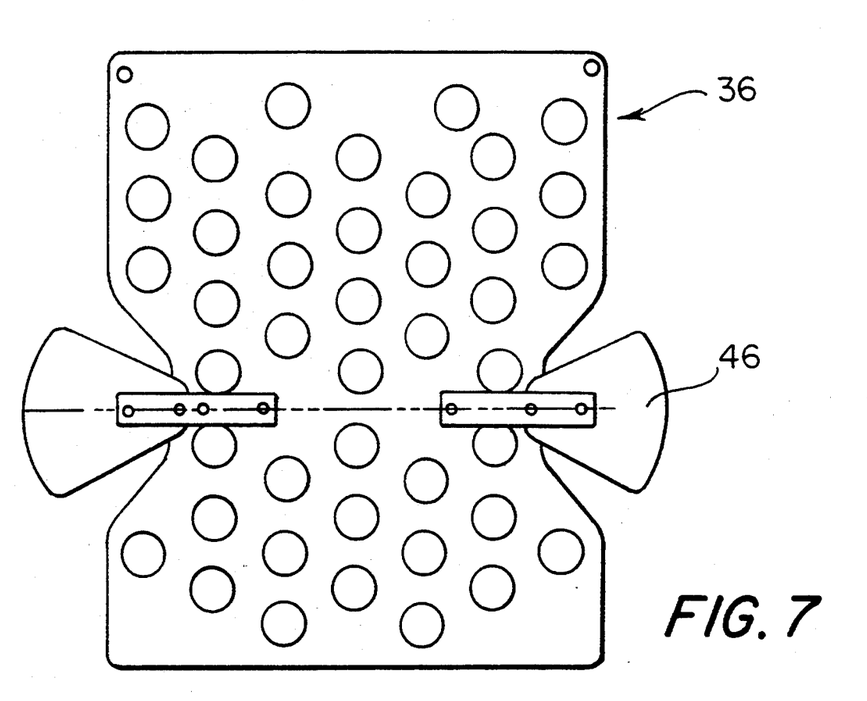
FIG. 7 is a diagram of the flex plate of the lumbar support mechanism.

As shown in FIGS. 4 and 5, lumbar support adjustment lever 26 is held in a locked position by a return spring 40. In order to change the degree of lumbar support, an occupant of seat cushion assembly 18 pulls adjustment lever 26 forward into an unlocked position. In this unlocked position, adjustment lever 26 is free to be moved upward or downward into one of the slotted locking positions provided by lever lock 39. As shown in FIGS. 5 and 6, a vertical motion of adjustment lever 26 is translated into a rotational motion of cam shaft 29 and lift cam 30. Rotation of lift cam 30 causes a horizontal displacement of flex plate 36 which in turn causes seat back cushion 35 to displace horizontally in the region corresponding to the lumbar region of the spine. This controllable displacement of the seat back cushion provides customized lumbar support for the seat occupant's lower back.

Figure 8:
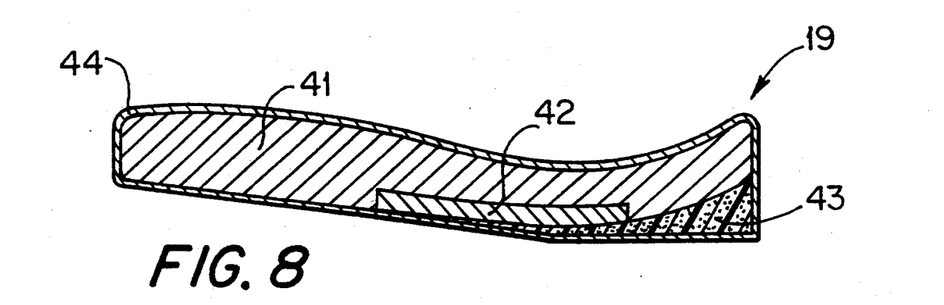
FIG. 8 is a cross-section of the seat pan cushion.

As shown in FIG. 8, seat pan cushion 19 includes three layers of cushioning material encased in a suitable covering 44. The three layers of seat pan cushion 19 comprise a semi-rigid bottom layer 43, a deformable top layer 41, and an energy-absorbing insert 42 disposed between the two other layers. Bottom layer 43 is made of a contoured material, such as polyurethane foam and provides a firm contoured foundation for the buttocks and thighs. Top layer 41 provides a comfortable seating platform for the buttocks and thighs. The contours of the top and bottom cushion layers and the semi-rigid nature of bottom layer 43 distribute seating pressure evenly across an occupant's buttocks and thighs. These design aspects also help reduce the load concentrations on the seat occupant's ischial tuberosities. Energy-absorbing insert 42 also helps to reduce stress concentrations from developing in the ischial tuberosities.

Energy-absorbing insert 42 is made of a rate-sensitive material that, under normal operating conditions, conforms to the shape of the buttocks and helps to evenly distribute loads across the buttocks. In the event of a rapid increase in seat pan load due to vertical acceleration, energy-absorbing insert 42 becomes more rigid, cushioning the ischial tuberosities from impact forces. Energy-absorbing insert 42 also dampens the vibrations transmitted from the airframe to the occupant and reduces cushion wear caused by vibration.

Figure 9:
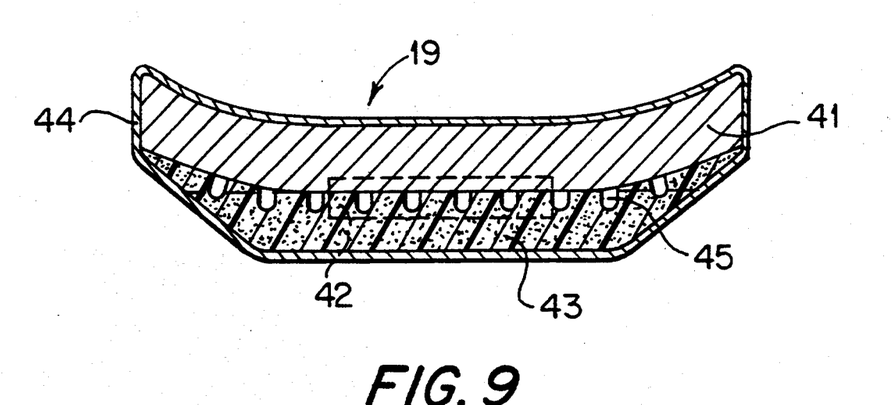
FIG. 9 is a cross-section of the seat pan cushion.

The three layers 41, 42 and 43 of seat pan cushion 19 are comprised of air-permeable, durable foams that promote ventilation and withstand wear caused by normal use and aircraft vibration. As shown in FIG. 9, bottom cushion 43 includes a series of ventilation channels 45 that further improve air circulation. The three cushion layers 41, 42, and 43 are suitably adhered together and encased in a durable outer covering 44.

The foregoing disclosure of a preferred embodiment of the present invention has been presented for purposes of illustration and description. It is not intended to be exhaustive or to limit the invention to the precise form disclosed. Many variations and modifications of the embodiment described herein will be obvious to one of ordinary skill in the art in light of the above disclosure. For example, seat back cushion 35 and lumbar support mechanism 34 of the present invention are shown as being separate assemblies, but it will be appreciated that they could very well be fabricated as one assembly or as integral parts of the seat bucket structure 17. In a similar example, seat pan cushion 19 and thigh adjustment mechanism 25 could also be part of an integral seat pan design.

The scope of the invention is to be defined only by the claims appended hereto, and by their equivalents.

What is claimed is:

1. An adjustable crewseat, comprising:
   (a) a seat pan cushion attached to a rigid seat pan having a top surface and a front edge and a rear edge;
   (b) a seat back cushion having a front and a rear surface, said rear surface attachable to a rigid seat back, said rigid seat back having a bottom edge, said bottom edge of the rigid seat back being attached to the rear edge of the rigid seat pan;
   (c) an adjustable thigh-support means comprising a tilt plate mounted between said seat pan cushion and the rigid seat pan of said seat cushion assembly, wherein said adjustable thigh-support means may be adjusted to increase or decrease the angle between said seat pan cushion and said rigid seat pan;
   (d) an adjustable lumbar support means mounted between said seat back cushion and the rigid seat back of said seat cushion assembly, wherein said adjustable lumbar support means may be adjusted to increase or decrease the horizontal displacement of said seat back cushion;
   (e) an L-shaped base plate having a front and a rear edge and a top and a bottom surface, the long leg of the L being horizontal and attached to the seat pan, and the short leg of the L being vertical and directed downwards at the front edge of the base plate and attached to the front of the seat pan;
   (f) said tilt plate having a front and a rear edge and a top and a bottom surface, said tilt plate hingeably connected to the rear edge of said base plate,
   (g) a mounting means on the top surface of said tilt plate to which the bottom surface of said seat pan cushion is attached; and
   (h) a tilt plate locking means hingeably connected to the bottom surface of the front edge of said tilt plate, said tilt plate locking means locking the tilt plate at a given angle respective to said base plate, wherein said tilt plate locking means comprises:
   (i) at least one lock lug having a mounting end for attachment to the top surface of said base plate and a locking end extending beyond the front edge of said rigid seat pan, said locking end bending slightly upwards and having a slot with a protruding tab; and
   (j) at least one slotted tang hingeably connected to the front edge of the bottom surface of said tilt plate, each at least one slotted tang having a vertically-slotted tongue extension, wherein said tongue extension is disposed through said slot of said at least one lock lug, said at least one slotted tang having both an unlocked position, wherein the tongue extension of the at least one slotted tang can slide vertically through the slot of said at least one lock lug to adjust the angle of said tilt plate with respect to said seat pan, and a locked position, wherein one of the vertical slots of the at least one slotted tang engages the protruding tab of the lock lug.

2. The adjustable crewseat of claim 1, wherein said tongue extension of said slotted tang further comprises a curled end for demarcating the sliding limits of the slotted tang and preventing the body of said tongue extension of said slotted tang from disengaging the slot of said at least one lug lock.

3. The adjustable crewseat of claim 1, wherein said tilt plate locking means further comprises at least one biasing means connecting the bottom surface of said tilt plate with said at least one slotted tang, wherein said biasing means pulls said at least one slotted tang towards the protruding tab of said at least one lock lug whereby said protruding tab may engage a vertical slot of said at least one slotted tang to provide a locked state of said tilt plate locking means.

4. The adjustable crewseat of claim 1, wherein said tilt plate locking means further comprises an adjustment handle mounted to said at least one slotted tang for allowing an occupant to pivotally disengage the at least one slotted tang from said protruding tab of said at least one lock lug, thereby changing the position of the at least one slotted tang in relation to said at least one lock lug and changing the angle of said seat pan cushion in relation to said rigid seat pan.

5. An adjustable crewseat comprising:
(a) an adjustable thigh support comprising:
  (i) a seat pan cushion,
  (ii) a tilt plate having a front and a rear, and having a top surface and a bottom surface, said seat pan cushion being attached to the top surface of the tilt plate,
  (iii) a base plate having a bottom surface and front and a rear, the rear of said base plate being hingeably attached to the rear of the tilt plate,
  (iv) a vertical handle attached to the front of the tilt plate, a portion of the handle extending downward to and attached to a vertical locking tang, said tang having multiple slots disposed vertically along the tang,
  (v) a lock lug attached to and extending from the front of the base plate to engage into the slots of the locking tang, and
  (vi) a rigid seat pan attached to the bottom of the base plate, said rigid seat pan having a rear edge; and
(b) an adjustable lumbar support mechanism comprising:
  (i) a seat back cushion having a front and a back, and a top edge and a bottom edge, said seat back cushion being attached to a rigid seat back, said rigid seat back having a bottom edge, the rear edge of said rigid seat pan being attached to the bottom edge of the rigid seat back,
  (ii) an adjustment lever disposed horizontally behind the seat back cushion and extending outside the seat back cushion;
  (iii) a cam shaft, extending horizontally across the back of the seat back cushion, attached to the adjustment lever such that when the lever is moved up and down, the cam shaft rotates,
  (iv) a flex plate positioned behind the seat back cushion, said flex plate having a front and a back, and a top edge and a bottom edge, and
  (v) a lift cam connected to the cam shaft such that when the cam shaft rotates, the lift cam also rotates to control the magnitude of a frontward bow of the flex plate.

6. The adjustable crewseat of claim 5, wherein the adjustable thigh support further comprises an extension spring running between the handle and the tilt plate.

7. The adjustable crewseat of claim 5, wherein the seat pan cushion comprises a first layer of semi-rigid material, a second layer of energy-absorbing, rate-sensitive material, and a third layer of deformable material.

8. The adjustable crewseat of claim 5, wherein the adjustment lever is attached to the cam shaft at an angle between 30 and 90 degrees.

9. The adjustable crewseat of claim 5, further comprising flex plate guides securing the bottom edge of the flex plate such that it can displace vertically, thus compensating for various degrees of plate bowing.

10. An adjustable crewseat comprising:
(a) a base plate having a bottom surface and a top surface, and a front edge;
(b) a tilt plate having a front edge and a top surface, hingeably connected to the top of the base plate;
(c) a seat pan having a front edge attached to the bottom surface of the base plate, the front edge of the base plate being bent around the front edge of the seat pan, said seat pan also having a rear edge;
(d) lock lugs attached to the upper surface of the base plate extending forward of the front edge of the base plate;
(e) a handle hingeably attached to the front edge of the tilt plate, the handle extending above and below the tilt plate;
(f) a pair of locking tangs attached to the handle, extending downward, the locking tangs having a series of vertically disposed slots; and
(g) a pair of lock lugs attached to the base plate, the lock lugs extending slightly forward of the base plate, wherein in an unlocked position, locking tangs are free to slide up and down, and in a locked position, locking tangs engage the lock lugs, holding the tilt plate in a locked position with respect to the base plate.

11. The adjustable crewseat of claim 10, further comprising an extension spring, disposed between the handle and the tilt plate, holding the locking tangs in the locked position.

12. The adjustable crewseat of claim 10, further comprising a seat pan cushion attached to the top surface of the tilt plate, said seat pan cushion comprising a first layer of semi-rigid material, a second layer of energy-absorbing, rate-sensitive material, and a third layer of deformable material.

13. The adjustable crewseat of claim 10, further comprising an adjustable lumbar support mechanism, said lumbar support mechanism comprising:
(a) a seat back cushion having a front and a back, and a top edge and a bottom edge, said seat back cushion being attached to a rigid seat back, and the bottom edge of said rigid seat back being attached to the rear edge of the rigid seat pan;
(b) an adjustment lever disposed horizontally behind the seat back cushion;
(c) a cam shaft, extending horizontally across the back of the seat back cushion, attached to the adjustment lever such that when the lever is moved up and down, the cam shaft rotates;

(d) a flex plate positioned between the seat back cushion and the rigid seat back, said flex plate having a front and a back, and a top edge and a bottom edge; and (e) a lift cam connected to the cam shaft such that when the cam shaft rotates, the lift cam also rotates to control the magnitude of a frontward bow of the flex plate.

14. The adjustable crewseat of claim 13, wherein the adjustment lever is attached to the cam shaft at an angle between 30 and 90 degrees.

15. The adjustable crewseat of claim 13, further comprising flex plate guides securing the bottom edge of the flex plate such that it can displace vertically, thus compensating for various degrees of plate bowing.

16. A helicopter crewseat comprising:
 (a) a rigid, approximately vertical, back surface;
 (b) a seat back cushion attached to the rigid back surface;
 (c) a flex plate attached between the seat back cushion and the rigid back surface, said flex plate having a bow towards the front of the crewseat;
 (d) an adjustment lever extending horizontally from within the seat back cushion, attached at an angle to a horizontally disposed camshaft within the seat back cushion;
 (e) a lift cam attached to the cam shaft lever approximately in the center of the cam shaft, such that when the adjustment lever is moved up and down, the cam shaft rotates, and the lift cam adjusts the degree of bow in the flex plate; and
 (f) an adjustable thigh support mechanism, comprising a seat pan cushion attached to a tilt plate, said tilt plate hingeably attached to an approximately horizontal base plate, a handle attached to the tilt plate extending downward from the tilt plate, and a locking tang having slots disposed vertically therein attached to the handle, extending downward from the handle to a lock lug having a mounting end for attachment to the top surface of said base plate and a locking end extending beyond the front edge of said rigid seat pan, said locking end having a slot therein, the lock lug engaging one of the slots in the locking tang to hold the tilt plate in a fixed position, and a rigid seat pan attached to the bottom surface of said base plate, the rear edge of said rigid seat pan being attached to the bottom edge of said rigid seat back.

17. The helicopter crewseat of claim 16, further comprising an extension spring, disposed between the handle and the tilt plate, holding the locking tang in the locked position.

18. The helicopter crewseat of claim 16, wherein said seat pan cushion comprises a first layer of semi-rigid material, a second layer of energy-absorbing, rate-sensitive material, and a third layer of deformable material.

19. The helicopter crewseat of claim 18, further comprising flex plate guides securing the bottom edge of the flex plate such that it can displace vertically, thus compensating for various degrees of plate bowing.

20. A seat cushion assembly comprising:
 (a) a seat pan cushion attached to a rigid seat pan having a top surface and a front edge and a rear edge;
 (b) an adjustable thigh-support means comprising a tilt plate mounted between said seat pan cushion and the rigid seat pan of said seat cushion assembly, said adjustable thigh-support means being adjustable to increase or decrease the angle between said seat pan cushion and said rigid seat pan;
 (c) an L-shaped base plate having a front and a rear edge and a top and a bottom surface, the long leg of the L being horizontal and attached to the seat pan, and the short leg of the L being vertical and directed downwards at the front edge of the base plate and attached to the front of the seat pan;
 (d) said tilt plate having a front and a rear edge and a top and a bottom surface, said tilt plate hingeably connected to the rear edge of said base plate;
 (e) a mounting means on the top surface of said tilt plate to which the bottom surface of said seat pan cushion is attached; and
 (f) a tilt plate locking means hingeably connected to the bottom surface of the front edge of said tilt plate, said tilt plate locking means locking the tilt plate at a given angle respective to said base plate; wherein said tilt plate locking means comprises:
 (i) at least one lock lug having a mounting end for attachment to the top surface of said base plate and a locking end extending beyond the front edge of said rigid seat pan, said locking end bending slightly upwards and having a slot with a protruding tab; and
 (j) at least one slotted tang hingeably connected to the front edge of the bottom surface of said tilt plate, each at least one slotted tang having a vertically-slotted tongue extension, wherein said tongue extension is disposed through said slot of said at least one lock lug, said at least one slotted tang having both an unlocked position, wherein the tongue extension of the at least one slotted tang can slide vertically through the slot of said at least one lock lug to adjust the angle of said tilt plate with respect to said seat pan, and a locked position, wherein one of the vertical slots of the at least one slotted tang engages the protruding tab of the lock lug.

21. The seat cushion assembly of claim 20, wherein said tilt plate locking means further comprises an adjustment handle mounted to said at least one slotted tang for allowing an occupant to pivotally disengage the at least one slotted tang from said protruding tab of said at least one lock lug, thereby changing the position of the at least one slotted tang in relation to said at least one lock lug and changing the angle of said seat pan cushion in relation to said rigid seat pan.

* * * * *